(12) United States Patent
Rouyre

(10) Patent No.: US 8,401,729 B2
(45) Date of Patent: Mar. 19, 2013

(54) DIAGNOSTIC TOOL FOR REPAIRING AIRCRAFT AND METHOD OF USING SUCH A TOOL

(75) Inventor: François Rouyre, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 382 days.

(21) Appl. No.: 11/480,367

(22) Filed: Jul. 5, 2006

(65) Prior Publication Data

US 2007/0010923 A1   Jan. 11, 2007

(30) Foreign Application Priority Data

Jul. 5, 2005  (FR) ..................................... 05 07127

(51) Int. Cl.
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl. ......... 701/29.3; 701/1; 701/31.4; 701/31.5; 701/32.7; 701/33.2; 701/34.2

(58) Field of Classification Search ............... 701/29, 701/14, 3, 32, 33, 207; 340/945, 438, 546, 340/539.24; 702/108, 62, 183, 184, 188; 455/423, 67.11; 342/357.09
See application file for complete search history.

(56) References Cited

U.S. PATENT DOCUMENTS

| | | | | |
|---|---|---|---|---|
| 4,899,292 A | * | 2/1990 | Montagna et al. ..................... 1/1 |
| 5,528,496 A | * | 6/1996 | Brauer et al. ..................... 701/32 |
| 5,778,381 A | * | 7/1998 | Sandifer ..................... 707/104.1 |
| 5,884,202 A | * | 3/1999 | Arjomand ..................... 701/29 |
| 6,055,468 A | * | 4/2000 | Kaman et al. ..................... 701/29 |
| 6,744,352 B2 | * | 6/2004 | Lesesky et al. ..................... 340/431 |
| 6,959,235 B1 | * | 10/2005 | Abdel-Malek et al. ..................... 701/33 |
| 7,020,580 B2 | * | 3/2006 | Peters et al. ..................... 702/183 |
| 7,752,572 B1 | * | 7/2010 | Shahrbabaki et al. ..................... 715/817 |
| 2002/0059270 A1 | * | 5/2002 | Schlabach et al. ..................... 707/100 |
| 2002/0138184 A1 | * | 9/2002 | Kipersztok et al. ..................... 701/29 |
| 2002/0198639 A1 | | 12/2002 | Ellis et al. |
| 2003/0083794 A1 | | 5/2003 | Halm et al. |
| 2003/0120501 A1 | * | 6/2003 | Peters et al. ..................... 705/1 |
| 2004/0078171 A1 | * | 4/2004 | Wegerich et al. ..................... 702/188 |
| 2004/0111197 A1 | | 6/2004 | Kipersztok et al. |
| 2004/0162651 A1 | * | 8/2004 | Halm et al. ..................... 701/29 |

FOREIGN PATENT DOCUMENTS

EP    1 426 870    6/2004

* cited by examiner

*Primary Examiner* — Khoi Tran
*Assistant Examiner* — Bhavesh V Amin
(74) *Attorney, Agent, or Firm* — Oblon, Spivak, McClelland, Maier & Neustadt, L.L.P.

(57) ABSTRACT

A device according to the present invention comprises:
- a central unit (8) having access to a database (18) in which there are stored not only information on the aircraft fleet to be managed but also an aircraft repair manual, this central unit (8) having means of communicating with the outside, and in particular with a technical center (16) of at least one aircraft manufacturer,
- at least one portable device equipped with visual display means as well as with means of wireless communication between the said portable device and the central unit (8).

Application to the analysis of damage observed in an aircraft during inspection thereof.

19 Claims, 4 Drawing Sheets

DIAGNOSTIC TOOL FOR REPAIRING AIRCRAFT AND METHOD OF USING SUCH A TOOL

BACKGROUND OF THE INVENTION

1. Field of the Invention

The present invention relates to a diagnostic tool for repairing aircraft and to a method that uses this tool.

The field of the present invention is inspection and repair, if necessary, of aircraft. Throughout its operational life, an aircraft undergoes control inspections of varying degree in accordance with the manufacturer's instructions. Such inspections normally must make it possible to detect worn parts and damage suffered by the aircraft. When a worn part is detected or damage suffered is discovered, it is necessary to determine whether the aircraft must be grounded for replacement or repair of the part, or whether, on the other hand, it can take off again and be repaired later.

2. Discussion of the Background

At present, if damage is observed, a damage sheet describing the damage is filled out. Firstly, this sheet is filled out by the person who inspects the aircraft. It is then passed on to a technical team of the airline company operating the aircraft, which analyzes the damage, consults the Structural Repair Manual, known under the initials SRM, and can supplement the sheet.

At this point, a decision is made as to whether or not the damage is within the permissible airworthiness limits. If so, no repair is effected and the aircraft is permitted to take off again. In contrast, if the damage is too severe, the question arises of knowing which type of maintenance is to be performed: change of parts or repair? Repair methods for typical damage are provided in the repair manual SRM. If the discovered damage corresponds to such typical damage, the airline company then repairs the aircraft in accordance with the instructions of the manual SRM. In contrast, if the discovered damage is of unknown type, the manufacturer is consulted to assist its customer in repairing its aircraft.

Several problems crop up in this process of repairing an aircraft. Firstly, at the stage of filling out the damage sheet, it may very well be that two persons, such as two technicians of two different airline companies, will not fill out this sheet in the same manner for the same damage. Because of cultural differences, for example, the descriptions and questions printed on the damage sheets may not be understood and interpreted in the same way in all parts of the world. Furthermore, differences in organization exist within the airline companies. For this reason, the processing of a sheet may be entirely different from one company to another. In one company, for example, the sheet will be filled out completely by one and the same person, whereas in another company it will be filled out at different levels.

The first decision to be made when damage is discovered in an aircraft is to determine whether the aircraft must be grounded or whether it can continue its service. Prolonged ground time is very costly and should be avoided, but neither should an aircraft be flown if there is a risk of an in-flight breakdown. This first decision must therefore be made very quickly. Furthermore, if the aircraft is grounded, it is advisable to determine quickly what type of repair must be effected, in order to limit the duration of such ground time.

SUMMARY OF THE INVENTION

The objective of the present invention is therefore to provide means making it possible to diagnose both reliably and rapidly whether or not an aircraft must be grounded when damage is observed. In addition, if the aircraft must be grounded and repaired, the means and/or the method according to the invention will make it possible to quickly determine which repairs must be effected.

To this end, the present invention therefore proposes a diagnostic device for aircraft, which comprises:

a central unit having access to a database in which there are stored not only information on the aircraft fleet to be managed but also an aircraft repair manual, this central unit having means of communicating with the outside, in particular with a technical center of at least one aircraft manufacturer, at least one portable device equipped with visual display means as well as with means of wireless communication between the said portable device and the central unit.

By using this device, the person inspecting the aircraft indicates all the characteristics of any damage in electronic form and sends them directly to the central unit. As an example, this unit is managed by a technical team of the airline company that owns the aircraft. The members of this team then receive real-time information concerning the observed damage, and they can immediately take charge of the problem. In addition, the fact that the information is in digital form permits faster processing, especially by shortening research time and by avoiding potential transcription errors, which can occur when information on paper is input into a computer system.

In a preferred embodiment, the portable device is provided with means of access to an aircraft model in digital form, and the visual display means of the portable device are interactive. Consequently, the person inspecting the aircraft can directly identify, on the digital model, which part or parts is or are affected by the observed damage. Damage location can therefore be accomplished very easily, without any language barrier, and in highly reliable manner.

The central unit is advantageously in communication with the outside via a connection to the Internet. By virtue of this connection, which preferably is secure, the information concerning the observed damage can also be sent to the outside, for example to request a supplementary opinion. In particular, it is possible to envision a secure Internet or other link between the central unit and a computer operated by the aircraft manufacturer.

As an example, at least one of the portable devices of the diagnostic device is a graphic tablet.

The means provided for wireless communication between the portable device and the central unit advantageously use WiFi technology. As of the date of filing of the present patent application, this is a priori the technology best suited to such communication.

Each portable device can also be provided with means of access to a repair manual. Consequently, the person inspecting the aircraft can establish a first analysis concerning the observed damage.

The present invention also relates to a diagnostic method for aircraft. According to the invention, this method comprises the following steps:

discovery of damage by an operator inspecting the aircraft, locating the damage on a digital model representing the aircraft, by means of a portable device equipped both with means for accessing the digital model and with visual display means, acquiring the characteristics of the discovered damage, communicating the characteristics and the location of the damage to a central unit, remote analysis, by means of a repair manual accessible from the central unit, of damage discovered by the operator inspecting the aircraft.

Such a method should make it possible, compared with the prior art methods, to gain substantial time between the moment when the damage is observed and the moment when a decision is made on the actions to be taken to repair this damage.

In such a diagnostic method for aircraft, it is advantageously provided that the portable device of the operator also contains a repair manual in memory, and that an analysis of the discovered damage is also made by the operator inspecting the aircraft. Although the said memory can be an internal memory of the transportable device, there can also be used an external medium, such as a DVD ROM.

In an advantageous alternative embodiment, the characteristics and location of the damage are also communicated to a technical center of the aircraft manufacturer. Consequently, the technical teams of the airline company that owns the aircraft and of the aircraft manufacturer can work in parallel to issue an opinion on the observed damage and to make a decision.

To benefit from more effective decision means, it is advantageously provided that, after the discovered damage has been repaired, information concerning the repairs effected is communicated to the aircraft manufacturer. Consequently, the manufacturer can update its databases and be aware of the state of each of the aircraft that it has manufactured. Such information is then very useful when new damage is observed in the aircraft. In this alternative version, the digital model used during the inspection of an aircraft is advantageously specific to each aircraft, and the aircraft manufacturer, after having received the information concerning the repairs effected on an aircraft, can modify the digital model of the corresponding aircraft in such a way that the new digital model integrates the repairs effected. The update of the digital model can then be delivered to the operator of the aircraft in question. This delivery can be made as soon as the model has been modified, or else regularly in the form of delivery of a CD ROM or DVD ROM. Also conceivable is a secure link via which all the updates of interest for the airline company in question can be downloaded with an access code and a password.

In the same way, the method according to the invention advantageously provides that the repair manual is supplemented when the repaired damage or similar damage did not yet appear in the repair manual.

The manufacturer advantageously manages an evolving database in which digital models are recorded for a set of given aircraft and updated regularly as a function of the repairs made. Thus it is always aware of the current state of the set of aircraft under consideration. This evolving database can also integrate the repair manual.

At the level of inspection of the aircraft, the portable device in turn advantageously integrates in its memory not only a digital model but also a repair manual as well as report sheets of observed damage, together with software means that allow it, for example, to create associations among the digital model, the repair manual and the report sheets stored in memory. The person inspecting the aircraft can then undertake a complete analysis, on the spot, of the problem posed by the discovery of any damage. As indicated in the foregoing, memory is to be understood either as an internal memory of the portable device (a graphic tablet, for example) or any data medium whatsoever (CD, DVD, hard disk, etc.).

BRIEF DESCRIPTION OF THE DRAWINGS

Details and advantages of the present invention will be better understood from the description hereinafter with reference to the attached schematic drawings, wherein.

DETAILED DESCRIPTION OF THE PREFERRED EMBODIMENTS

Figure 1:
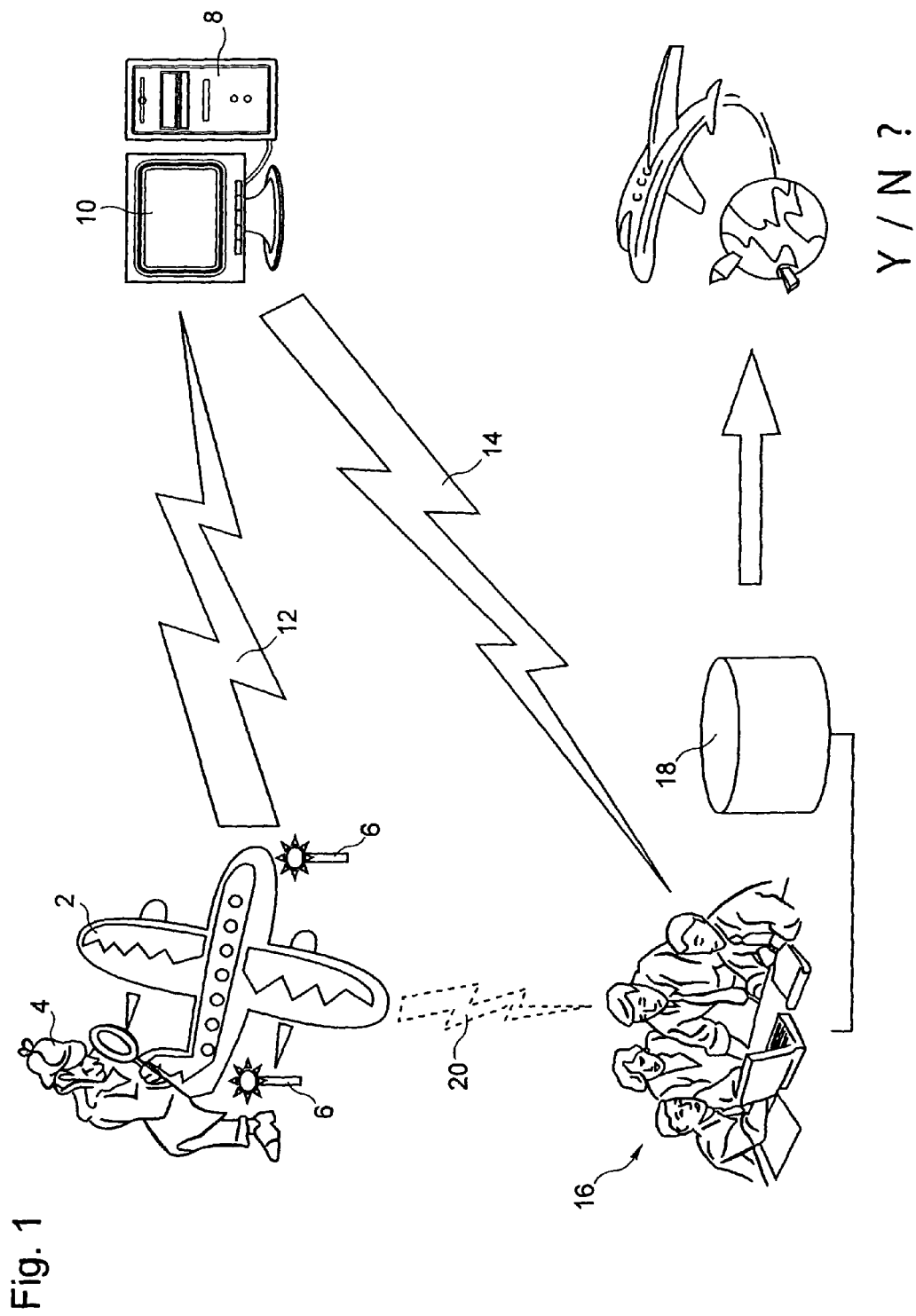
FIG. 1 is a diagram illustrating a method for diagnosis of damage in an aircraft.

The description hereinafter is written with reference to an airplane inspection within an airline company. At regular intervals, every aircraft is inspected in order to detect all defective or worn parts. When damage is observed during such an inspection, it is necessary to determine quickly whether the aircraft must be grounded in order to effect the necessary repair or whether it can still fly without jeopardizing the safety of the persons on board.

In order that a decision can be made quickly, the present invention proposes to proceed, for example, as indicated hereinafter.

During an inspection, an airplane 2 is examined by an inspector 4. The latter has a list of points to be checked and must report any anomaly.

This inspector 4 is equipped with a portable electronic device provided with visual display means as well as with an electronic memory. In a preferred embodiment, this device is a graphic tablet having an interactive screen. The functioning of this graphic tablet will be explained in more detail with reference in particular to FIGS. 2 and 3.

This graphic tablet also integrates wireless communication means. In a preferred embodiment, these communication means function in accordance with the WiFi (for "Wireless Fidelity") standard. This wireless communication technique uses an Ethernet network 12. Such a network uses a data packet transmission protocol that makes it possible to achieve different rates, which may vary depending on the medium employed. To permit the graphic tablet to communicate with such a network, the inspection zone of airplane 2 is equipped with connector ports 6 coupled to Ethernet network 12. The information received by inspector 4 during inspection of airplane 2 are sent by the transmission means of the graphic tablet to a technical team of the airline company. This team is equipped with a computer having a central unit 8 and a monitor 10. In its internal memory or on any information medium whatsoever (CD ROM, DVD ROM, etc.), this computer contains a structural repair manual, known by its initials SRM. Via Ethernet network 12, central unit 8 can communicate not only with the graphic tablets of inspectors 4 but also, via Internet network 14, can communicate with a team 16 of technicians of the manufacturer of airplane 2. This team 16 is formed to provide a response to the airline company appealing to it. This team is in possession of all the technical elements that will enable it to make a decision, these elements being pooled in a database 18, described in more detail hereinafter with reference to FIG. 4. The response given by the team 16 of technicians is schematically represented by an airplane in flight and the logo Y/N ? (for yes/no ?).

Inspector 4, tasked with examining airplane 2 in detail, uses his graphic tablet to furnish all the information necessary for making a decision with regard to the damage that he has just discovered.

In novel manner, the memory of the graphic tablet used integrates a computerized model of aircraft 2 examined. The aircraft manufacturers are in possession of all the digital models of the machines that they manufacture. Here it is possible to imagine a light version of the manufacturer's digital model. This digital model can be stored in the internal memory of the graphic tablet, but it also can be stored on a medium such as a DVD. In such a case it is possible to imagine a DVD library, wherein each DVD corresponds to one airplane of the fleet of the airline company or to a type of airplane of that company.

Of course, visual display software is installed on the graphic tablet. The software used depends on the format of the files comprising the digital model.

The graphic tablet also integrates the SRM repair manual of airplane 2 under consideration. This SRM manual is associated with a repair database.

The characteristics of the observed damage are indicated on a report, referred to hereinafter as the DRS report. The various known DRS reports of the airline company can also be stored in memory in the graphic tablet.

Specific management software makes it possible to navigate in the three databases stored in memory in the graphic tablet and to switch from one database to another by virtue of computerized associations.

As already mentioned in the foregoing, the graphic tablet communicates with a technical center of the airline company via a WiFi link (or any other type of wireless link). It concerns, for example, the technical center in which, in the art prior to the present invention, reports in paper form were studied before a decision was made as to whether or not the inspected airplane would be grounded.

It is also possible to provide that data will be transmitted directly from the graphic tablet to the manufacturer's team 16 of technicians, as symbolized by arrow 20 in the form of dashes. This direct link, just as all other links mentioned in the foregoing (via the Ethernet network 12 and the Internet network 14) are preferably secure links, such as password-protected links.

Figure 2:
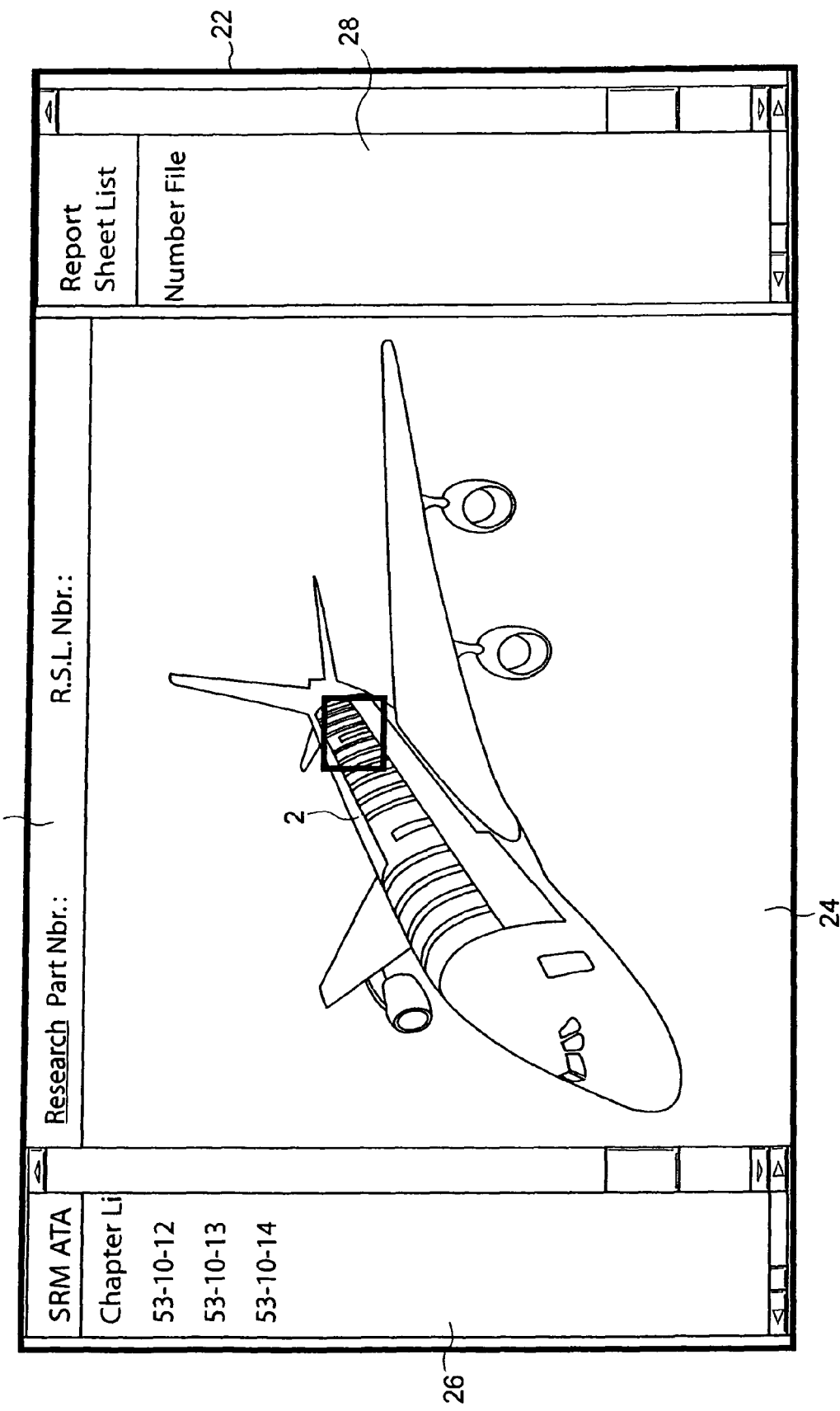
FIG. 2 is an example of a display on a portable electronic device used according to the invention.

FIG. 2 represents a screen 22 of a graphic tablet. In the illustrated embodiment, this screen has a central graphic zone 24 around which there are disposed two columns and a title bar. Thus, at the left of graphic zone 24, the various ATA (for Air Transport Association) chapters permitting each part of an airplane to be defined are listed in a first column 26. In the example illustrated in FIG. 2, column 28 to the right of central zone 24 relates more particularly to the database containing reports (in English report sheet) on the observed damage. Finally, the essential information about the part on which the damage was observed is summarized in a title bar 30.

To make his report, inspector 4 can, for example, first choose the ATA chapter corresponding to the damage. Using a vertical scroll bar, he can navigate through the list of chapters. In the example represented in the drawing, inspector 4 chooses Chapter 53, which pertains to the fuselage, and Subchapter 10, which pertains to the main structure of this fuselage. The various parts concerned by this chapter and this subchapter then appear in central graphic zone 24, in a large scale diagram. The different parts can be distinguished by the fact, for example, that they appear in a color different from the rest of the diagram.

We recall here that screen 22 is an interactive screen. As an example, it functions by means of an electronic pen. Using this pen, inspector 4 defines, on the diagram of airplane 2 represented in graphic zone 24, a frame in which the damage to be analyzed is located. An enlargement of the framed zone, such as illustrated in FIG. 3, then appears in graphic zone 24.

Figure 3:
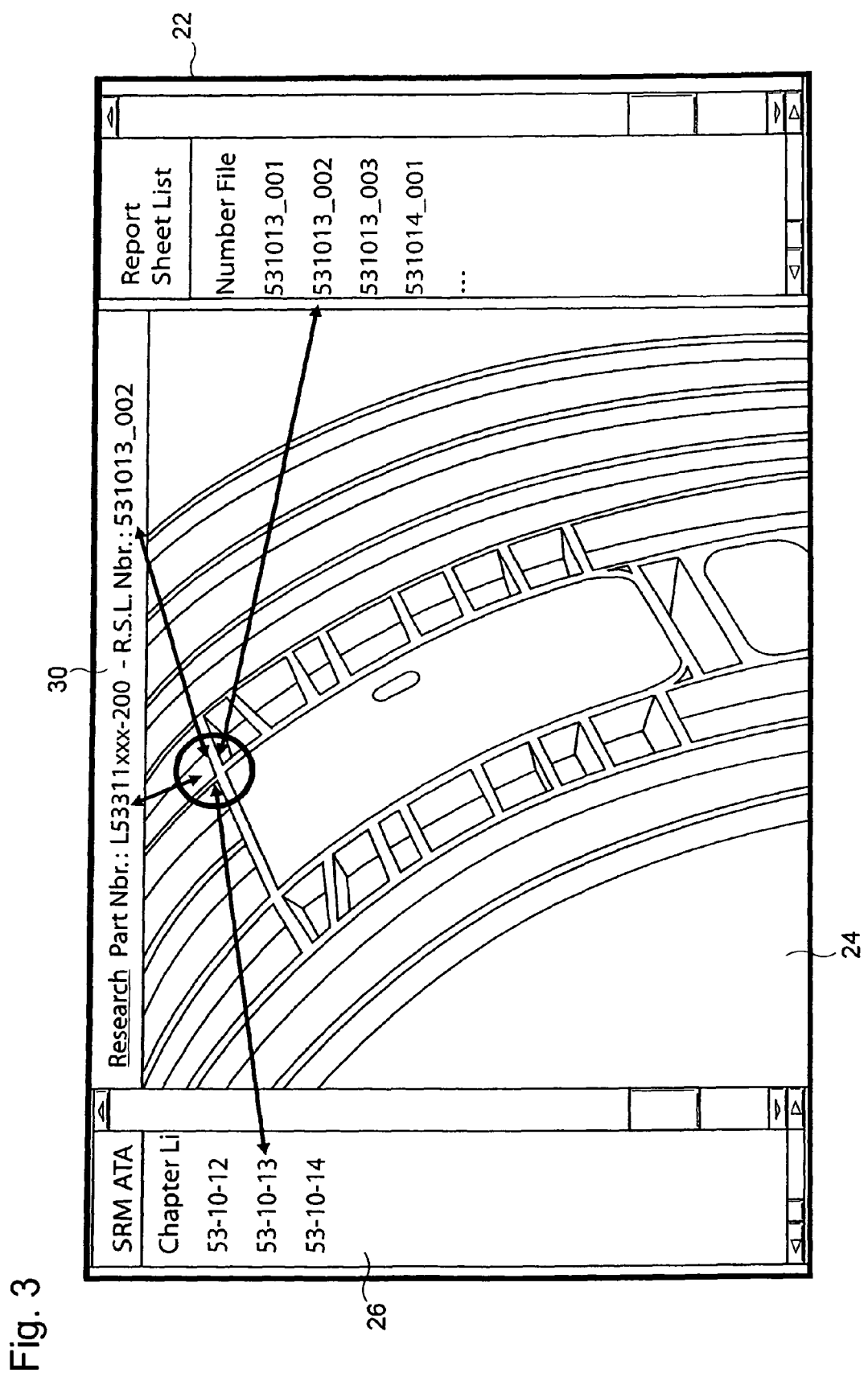
FIG. 3 is another example of a display screen on this portable electronic device.

The parts appear distinctly in this FIG. 3. In the present example, one magnification level has been shown. It is conceivable that the damaged element can be seen immediately in the first view of the digital model. However, it may be necessary in certain cases to zoom in several times before reaching a sufficient level of detail that the damaged element can be precisely identified. This element is then designated by inspector 4 by means of his electronic pen. The management software of the graphic tablet recognizes the part in question immediately, and the reference of this part can be relayed to title bar 30 above graphic zone 24. To this part there corresponds a subchapter of the ATA standard, and this subchapter is indicated in left column 26 of screen 16. In the present case, the number of this subchapter is 53-10-13. As an example, this number may then be shown in a color different from that of the other subchapters mentioned in this column.

In the right column there appear numbers corresponding to the various reports established previously for the part in question (or possibly for a similar part if, for example, a distinction is made between a right part and a left part). Inspector 4 can then consult the previous reports and indicate, for example, if the observed damage is identical to any previously recorded damage.

Finally inspector 4 is able to fill out his report about the observed damage. This report is preferably presented in digital form, and is filled out on the graphic tablet. As soon as the report is complete, inspector 4 is prompted to send it. Depending on the option chosen, the report that has just been established is immediately sent to the computer containing central unit 8, in order to be processed by the airline company, and if necessary at the manufacturer of airplane 2.

The technical team of the airline company has at its disposal both the information furnished by inspector 4 and the structural repair manual SRM corresponding to inspected airplane 2. Of course, this team has at its disposal all the data specific to the airplane in question: actions already taken, flight hours, etc. On the basis of all this information, the technical team of the airline company should be able to appraise whether airplane 2 can fly in complete safety with the damage that has been observed or, on the other hand, whether it will be necessary to ground and repair airplane 2. In case of any doubt whatsoever about the decision to be made, the problem can be relayed via the Internet network 14 to the manufacturer of airplane 2. Team 16 of technicians is then in position to give a definitive response.

As is evident from the foregoing, several decision levels, for example, can be provided. A first decision level can be at the level of inspector 4. A second level is then at the level of the airline company, and the third level involves the manufacturer. There can also be provided a chain of information, with the requirement that the decision be made at the end of the chain, by the manufacturer in the case of damage not covered in the SRM. In such a case, it is of course preferable that the manufacturer be informed as soon as possible of the discovered damage, and it is therefore preferable to have a direct link between inspector 4 and team 16 of technicians. Thus team 16 of technicians can be very quickly brought up to date about the damage found in airplane 2.

The present invention also provides for giving the different persons involved enhanced means to permit them to make a decision.

Under the circumstances of the art prior to the present invention, the manufacturer and the airline companies are in possession of a database forming a structural repair manual known commonly by the name SRM. This manual contains an entire series of typical repairs that the airline companies can effect when they observe corresponding damage in their aircraft.

The invention proposes here to supplement database SRM by a supplementary database, designated SRM', in which there would be pooled all the information concerning damage sustained by airplanes together with the corresponding repairs that had been decided on and effected.

These two databases (SRM and SRM') are then pooled in the global database 18 mentioned hereinabove. This global database is integrated and managed within the computerized system 32 used by the airplane manufacturer in the scope of logistic support for the airline companies in maintenance of their fleet.

Figure 4:
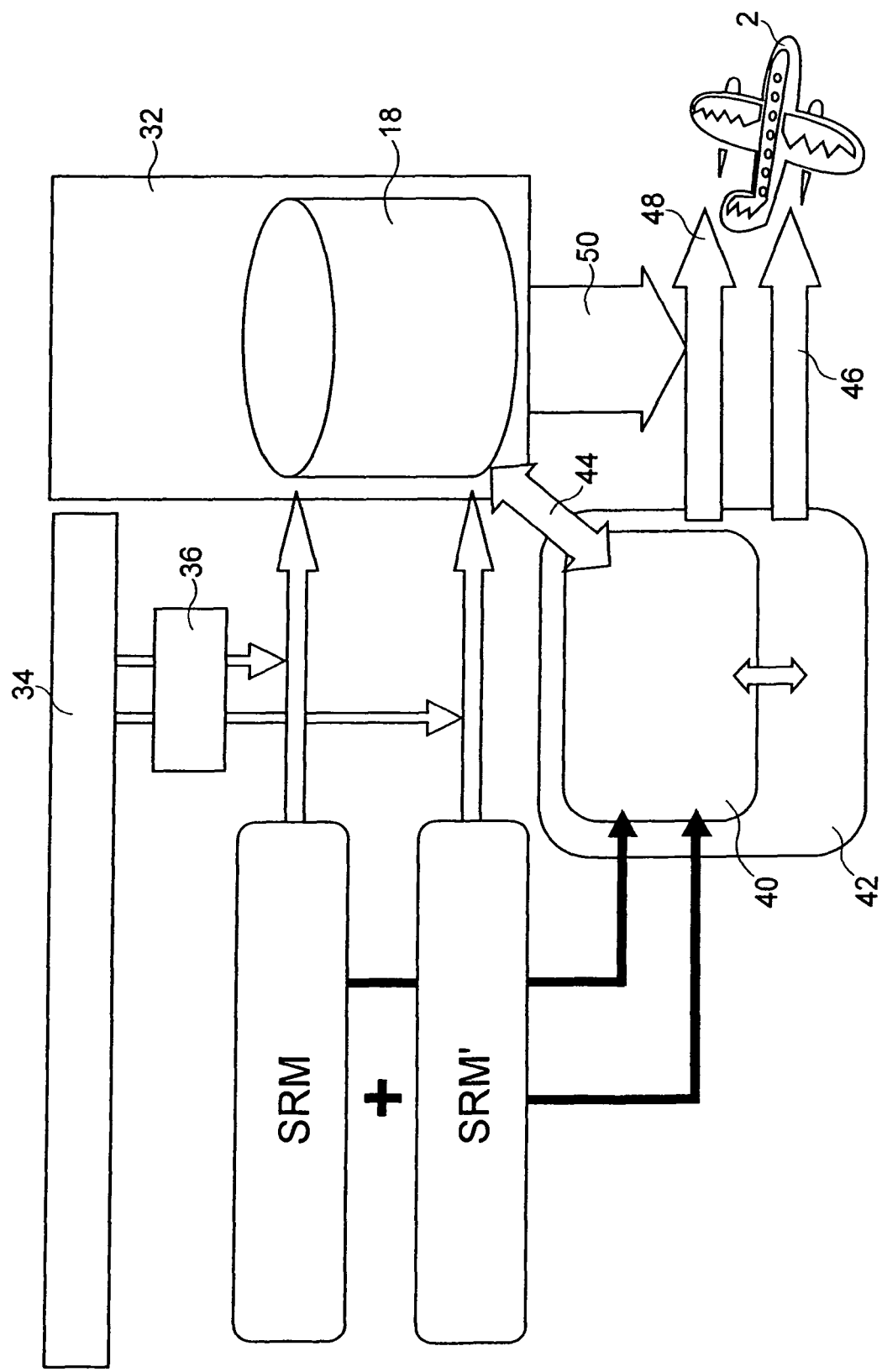
FIG. 4 illustrates various databases that may be involved in a process according to the invention.

In FIG. 4, frame 34 illustrates the diverse information collected by the airplane manufacturer, especially from various airline companies. Since the reports about observed damage are in electronic form, these reports 36 are integrated, possibly after being processed, either in database SRM or in database SRM', and thus supplement global database 18.

As indicated hereinabove, a digital model of each airplane is available. This digital model is represented by reference numeral 40 in FIG. 4. This digital model 40, possibly in a simplified version, is employed within the airline company and is located in the graphic tablet, in this case symbolized by a frame 42. When repairs are effected on an airplane, whether they are typical repairs in conformity with the manual SRM or special repairs such as those archived in the database SRM', they are taken into account in order to modify digital model 40. Thus digital model 40 evolves in the course of time in the same manner as the corresponding airplane 2.

The airline company regularly receives updates of the digital model of its airplanes. These updates are furnished in the form, for example, of a DVD ROM for each airplane. The double arrow between digital model 40 and frame 42 indicates that digital model 40 can be regularly updated.

The airline company can also benefit from all or part of the updates made at the level of global database 18. This database 18, or an extract therefrom, can be integrated in graphic tablet 42. A link 44 can be created between global database 18, forming an expanded repair manual, and graphic tablet 42 and/or updated digital model 40.

With all these new elements, it can be provided, for example, that when damage represents typical damage for which the airline company has repair capability, then the decision—symbolized by an arrow 46—is made at the level of the airline company, whereas in the case of damage not covered in the databases accessible at the level of the airline company, the decision—symbolized by an arrow 48—of knowing whether the airplane must be grounded for repairs or can be repaired later can be made only with the approval 50 of the airplane manufacturer.

All the means described hereinabove contribute to making it possible to decide quickly, after discovery of any damage on an airplane, whether the said airplane must be grounded or can continue to fly without risk for the persons on board.

Of course, the embodiment described hereinabove is a preferred embodiment, and it would not be outside the scope of the invention if certain of the means were not used and/or adopted.

The method described hereinabove also makes it possible to determine very quickly which repair must be effected on an aircraft. In this method, the manufacturer assists the airline companies by quickly proposing thereto a repair based on previous experience with all airplanes of the same type that are flying or that have flown throughout the world. The manufacturer can also use solutions for airplanes that are not of the same type but are of the same family as the airplane in which the damage was observed.

As explained in the foregoing, global database 18 managed by the manufacturer is interactive. The description provides that an update of the structural repair manual will be delivered regularly to each airline company. In FIG. 4, this information exchange is symbolized by arrow 44. This arrow 44 can also symbolize a secure link between computerized system 32 of the manufacturer and each airline company. This link is made secure by a password, for example, and the airline company has access to predetermined information as a function of the password. It is clear that information concerning a first airline company may be confidential and must not be divulged to a second airline company. By permitting an airline company to access its global database 18 directly, the manufacturer gives the airline company the means of making a decision about the repairs to be effected more quickly. In this way an efficient tool is placed at the disposal of the airline companies.

The use of an interactive digital model permits ergonomic preparation of the report about the observed damage, making it possible to overcome all the linguistic barriers. In fact, a large portion of the report prepared by the inspector examining the aircraft is achieved visually.

The present invention is not limited to the preferred embodiment and to its alternative versions described hereinabove. It also relates to all alternative embodiments that can be understood by the person skilled in the art within the scope of the claims hereinafter.

The invention claimed is:

1. A diagnostic system for an aircraft, said aircraft being one of a plurality of aircraft forming an aircraft fleet, said system comprising:

an outside center located remote from said aircraft at a manufacturer of said aircraft, said outside center having a database in which are stored a plurality of aircraft models in digital form, each aircraft model corresponding to one of said aircraft in said aircraft fleet and an aircraft repair manual, a central unit remote from said outside center and from said aircraft, said central unit being configured to exchange information about said aircraft with said outside center, at least one portable device equipped with a visual display as well as with a wireless communication device to communicate remotely between said portable device and the central unit when the portable device is outside and inside the aircraft and to communicate remotely between said portable device and said outside center when the portable device is outside and inside the aircraft, wherein the portable device is configured to access at least one aircraft model of said aircraft models in digital form, wherein the visual display of the portable device is interactive and comprises a first interactive display zone for displaying, based on one aircraft model, selection options for aircraft parts, the visual display further comprises a second display zone for displaying, a graphical representation of an aircraft part selected via said interactive first display zone, and the first interactive display zone and the second display zone are displayed at a same time, wherein after the damage to said aircraft has been repaired, communicating information concerning repairs effected to the manufacturer at the outside center, and after having received the information concerning the repairs effected on said aircraft, modifying the digital model of said aircraft by said aircraft manufacturer in such a way that the modified digital model integrates the repairs effected.

2. A diagnostic system for aircraft according to claim 1, wherein the central unit is configured to communicate with the outside center via a connection to the Internet network.

3. A diagnostic system for aircraft according to claim 1, portable device is a graphic tablet.

4. A diagnostic system for aircraft according to claim 1, comprising a plurality of portable devices, wherein each portable device comprises means for accessing said repair manual.

5. A diagnostic method for an aircraft, said aircraft being one of a plurality of aircraft forming an aircraft fleet, said method comprising the following steps:
maintaining a database that includes a memory on which is stored a plurality of aircraft models in digital form, said database being maintained at an outside center located remote from said aircraft at a manufacturer of said aircraft and from said aircraft fleet,
establishing a communication between a central unit and said outside center, said central unit being remote from said outside center, and from said aircraft,
establishing a communication between said central unit and a portable device, including a processor, when said portable device is outside said aircraft,
establishing a communication between said outside center and said portable device when said portable device is outside said aircraft,
downloading, with said portable device, one digital model corresponding to said aircraft being inspected,
displaying, based on said digital model and in an interactive first display zone of a display screen of the portable device, selection options for aircraft parts of said aircraft being inspected,
receiving an input with said interactive first display zone corresponding to a selected part of said aircraft being inspected,
displaying based on said input, in a second display zone of said portable device, a graphical representation of the selected part, wherein the first interactive display zone and the second display zone are displayed at a same time,
acquiring, by said portable device, characteristics of a damage for said selected part,
communicating the characteristics and location of the damage from said portable device to said central unit remote from said aircraft,
receiving, at said portable device, information concerning repair of the damage based on a repair manual accessible from the central unit,
displaying said information concerning repair on said portable device, and
communicating after the damage has been repaired, information concerning repairs effected to an aircraft manufacturer, and modifying, after having received the information concerning the repairs effected on said aircraft, the digital model of said aircraft by the aircraft manufacturer in such a way that the modified digital model integrates the repairs effected.

6. A diagnostic method for aircraft according to claim 5, further comprising storing at the portable device said repair manual in memory.

7. A diagnostic method for aircraft according to claim 5, further comprising communicating the characteristics and location of the damage to the outside center remote from said aircraft and from said central unit.

8. A diagnostic method for aircraft according to claim 5, further comprising delivering an update of the digital model to the portable device.

9. A diagnostic method for aircraft according to claim 5, further comprising supplementing the repair manual when the damage or similar damage did not yet appear in the repair manual.

10. A diagnostic method for aircraft according to claim 5, further comprising managing said database in which digital models are recorded for a set of given aircraft and updating said database regularly as a function of the repairs made.

11. A diagnostic method for aircraft according to claim 10, wherein the database also stores the repair manual.

12. A diagnostic method for aircraft according to claim 5, wherein the portable device integrates in its memory said digital model and said repair manual as well as report sheets of observed damage, and further comprising creating associations among the digital model, the repair manual and the report sheets stored in memory.

13. A diagnostic system for an aircraft according to claim 1, wherein said outside center is a technical center of at least one aircraft manufacturer, and said central unit is a technical center for an airline that operates said aircraft being diagnosed.

14. A diagnostic system for an aircraft according to claim 1, wherein said visual display of the portable device is configured to display, in said second zone, different magnification levels of said graphical representation of said aircraft part.

15. A diagnostic system for an aircraft according to claim 1, wherein said first display zone is configured to display information identifying Air Transport Association (ATA) chapters and sub-chapters defining each part of said airplane being inspected.

16. A diagnostic system for an aircraft according to claim 1, wherein said visual display further comprises a third display zone for displaying a report on said aircraft part whose graphical representation is displayed in said second display zone.

17. A diagnostic system for an aircraft according to claim 16, wherein said portable device includes a receiving unit configured to receive information about said damage, a reporting unit configured to complete said report with said information about said damage, and a transmitting unit configured to transmit the completed report to said central unit.

18. A diagnostic system for aircraft according to claim 1, wherein said one aircraft model is aircraft specific so as to correspond to a single aircraft being diagnosed among said aircraft fleet, and wherein said aircraft model is a manufacturer digital model from a manufacturer who manufactured said aircraft being diagnosed.

19. A diagnostic system for an aircraft according to claim 1, wherein if the aircraft model for the aircraft stored in the database does not include sufficient information to repair damage to said aircraft, the portable device directly communicates with technicians of the manufacturer of the aircraft.

* * * * *